United States Patent [19]

Klemt

[11] 3,795,894

[45] Mar. 5, 1974

[54] METHOD AND APPARATUS FOR COMPARISON

[76] Inventor: Arthur Klemt, Roggensteiner Strasse 5, Olching 8031, Germany

[22] Filed: Sept. 23, 1971

[21] Appl. No.: 183,257

Related U.S. Application Data

[63] Continuation of Ser. No. 879,771, Nov. 25, 1969, abandoned.

[30] Foreign Application Priority Data

Nov. 28, 1968 Germany .......................... 1811420

[52] U.S. Cl. ............ 340/146.3 MA, 340/146.3 ED

[51] Int. Cl. ............................................ G06k 9/06

[58] Field of Search ..........340/146.3 MA, 146.3 S, 340/146.3 Z, 146.3 ED, 146.3 T

[56] References Cited

UNITED STATES PATENTS

| | | | |
|---|---|---|---|
| 3,160,855 | 12/1964 | Holt | 340/146.3 ED |
| 3,192,505 | 6/1965 | Rosenblatt | 340/146.3 T |
| 3,104,369 | 9/1963 | Rabinow et al. | 340/146.3 MA |
| 3,176,271 | 3/1965 | Mader | 340/146.3 MA |
| 3,182,290 | 5/1965 | Rabinow | 340/146.3 MA |
| 3,496,542 | 2/1970 | Rabinow | 340/146.3 MA |

*Primary Examiner*—Paul J. Henon
*Assistant Examiner*—Joseph M. Thesz, Jr.
*Attorney, Agent, or Firm*—Marn & Jangarathis

[57] ABSTRACT

A method of comparison and the apparatus therefor is provided for use in character recognition systems wherein voltages representing the features of an unknown character are applied to resistance networks which produce potential levels in response thereto. The values of the resistors in the resistance networks are determined in accordance with a plurality of predetermined variations among characters. The potential levels produced are compared with predetermined levels and the result of the comparison is representative of the identity of the character.

24 Claims, 9 Drawing Figures

Inventor :

Inventor :

Inventor:

METHOD AND APPARATUS FOR COMPARISON

This is a continuation of application Ser. No. 879,771 filed Nov. 25, 1969 now abandoned.

This invention relates to a method of comparison and apparatus therefor, and more particularly, to comparator methods and apparatus adapted for use in character recognition systems.

In various technological arts, it is frequently desired to automatically classify a presented object, which may be characterized by discrete physical features, in one of m predetermined groups. Such classification is useful, for example, in interpreting photographic matter, evaluating data, sorting electronic components and recognizing geometric configurations. The last mentioned use finds application in character recognition.

Prior art character recognition systems recognize an optical pattern, such as a numeral, by determining the average measured photoelectric brightness of an area containing that pattern and comparing the measurement with a stored standard. For the ten types of numerals, i.e., 0,1 . . . 9, each type may be separately distinguished, and its shape identified. Difficulty arises, however, when deviations occur among the representatives of each type, as in the case with handwritten numerals. To overcome such difficulty, one type of conventional character recognition system attempts to store practically all possible handwritten shapes of the numerals 0–9, and compares the numeral to be identified with each stored shape. This form of solution to the problem, however, results in an overwhelmingly large number of stored samples of handwritten numerals and a long and complicated process or comparison.

Instead of storing individual shapes of characters, other prior art character recognition systems store the mean values of the features of representative shapes together with "distance functions" for the evaluation of the deviations from said mean values. The distance functions prescribe intervals within which the features of the unknown shape must correspond for proper classification thereof. For *n* features, only 2 *n* values need be stored for each representative shape, each value defining an upper or lower bound of the aforementioned interval. Although storage requirements are reduced hereby, resolution of characters is decreased.

Other prior art character recognition systems attempt to reduce the above mentioned large storage requirement and long and complex comparison process by storing outlines or boundaries of the numerals 0–9. The numeral to be identified is compared with these outlines and if the numeral falls within one of these boundaries, it is identified. However, this reduction in storage brings about a loss in discrimination between similar characters, and numerals that are clearly representative of one type of character may fall within the boundaries of another type of character resulting in erroneous identification.

Still other prior art character recognition systems employ the principle of contour following. In these systems, a light ray, governed by photo sensors and a control circuit, follows the outline of the numeral to be identified. When following the contour, the control circuit generates signals which are compared with stored signals computed in a predetermined manner, and representing the contours of known numerals. Contour following is useful where there are considerable variations among characters of each type because their contours remain substantially uniform, even though the characters may vary. Although there is sufficient discrimination between similar characters of different types, the control circuit and comparison device conventionally used to implement contour following techniques are highly complicated and expensive, and the technique itself is very sensitive to interruptions of the contour, which frequently occur with handwriting.

Therefore, it is an object of the invention to provide a simplified method of comparison and inexpensive apparatus therefor, which method and apparatus may be used in character recognition systems.

It is another object of this invention to provide a method of comparison and apparatus therefor which may be used to rapidly and reliably classify an unknown condition represented by data.

It is a further object of this invention to provide a method of comparison and apparatus therefor which may be used in character recognition systems wherein it is unnecessary to compare unknown character with a large number of stored characters in order to accurately identify such unknown character.

It is an additional object of this invention to provide a method of comparison and apparatus therefor which may be used in character recognition systems wherein handwritten characters, such as numerals, that are susceptible to deviations caused by differences in handwriting, are accurately identified and precise discrimination therebetween is readily available.

Various other objects and advantages of the invention will become clear from the following detailed description of an embodiment thereof, and the novel features will be particularly pointed out in connection with the appended claims.

In accordance with the invention, a method of comparison and the apparatus therefor, adapted for use in character recognition systems, is provided wherein a plurality of voltages, which represent distinctive features of an unknown character which may deviate from a standard exemplary type, are compared with predetermined potential levels in networks of components, the parameters of which are established in accordance with predetermined variations among representative characters of the same type, resulting in a determination of the unknown character.

The invention will be more clearly understood by reference to the following detailed description of an embodiment thereof in conjunction with the accompanying drawings in which:

FIG. 1 is a block diagram of conventional apparatus used in carrying out a well known method of character recognition;

FIGS. 2*a*–2*d* are graphical representations illustrative of the identification techniques which may be used by the conventional apparatus depicted in FIG. 1;

Figure 1:
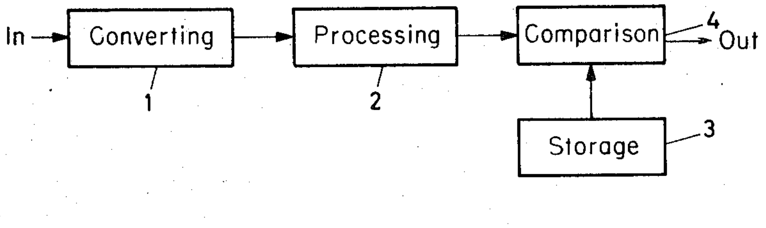

Referring now to the drawings, and in particular to FIG. 1, there is shown a block diagram of apparatus conventionally used in character recognition systems. The apparatus illustrated in FIG. 1 comprises converting means 1, processing means 2, storage means 3 and comparator means 4. The converting means 1 may be any well known device that produces electrical signals in response to an optical pattern that is sensed. Such devices may be photo sensors arranged in matrix form, photo electric diodes, video cameras, etc. For the case of handwritten numerals, the electrical signals are a measure of brightness intensity or the density of black caused by writing dark numerals on a light background. The converting means 1 is connected to the processing means 2 and thus the electrical signals produced by the converting means 1 are applied to the processing means 2 where they are modified in form so as to be suitable for comparison with electrical signals stored in storage means 3. Processing means 2 may be an analog-to-digital converter, an a.c. to d.c. converter, or it may take the form of a modulator such as amplitude modulator or phase modulator, or it may be an arithmetical summing device. The processed signals are compared with stored signals in comparison means 4 which may comprise well known analog comparator circuits such as differential amplifiers, arithmetical subtractors, phase comparators, etc., or may comprise well known digital comparators such as AND-gate, adder circuit, or other conventional logic circuit. The stored signals are applied to comparison means 4 from storage means 3 which may store digital signals in a memory such as a ferrite core or flip-flop circuits, or a magnetic drum, disc or tape. Storage means 3 may also comprise capacitors which store discrete analog voltage levels or other analog storage devices well known in the art. The signals stored in storage means 3 represent all the possible shapes of the numerals 0–9. Comparison means 4 compares the processed signals from processing means 2, which represents the shape of the character sensed by converting means 1, with each stored shape. A favorable comparison results in rocognition of the character as the numeral to which it wqs favorably compared.

It will become readily apparent from the subsequent description that the instant invention is a modification and improvement of the apparatus of FIG. 1. Thus, if a presented object admits of *n* representative features, the values of which are subject to variations, converting means 1 may derive *n* electrical quantities such as voltages, proportional to said *n* representative features, and generate two oppositely phased voltage signals associated with each of said *n* electrical quantities. Processing means 2 may comprise *n* resistor networks for each predetermined type of object, all connected to converting means 1. Each of said n resistor networks may be comprised of *n* combination resistors and a summation resistor. One end of each combination resistor and one end of the the summation resistor in each resistor network are connected to a common point, and the other end of each combination resistor is coupled to converting means 1 so that one of said two oppositely phased voltage signals is applied thereto. The other end of the summation resistors in the resistor networks are connected in common relationship. The value of each combination resistor in each resistor network is determined such that the potentials generated at the summation resistors are independently derived from the generated voltage signals of opposite phase and said values, and that the standard deviations of each of said independently derived potentials becomes minimal for a predetermined representative sample of objects corresponding to said predetermined type of objects, and the standard deviations thereamong are minimal when said presented object corresponds to said predetermined type of object. Comparison means 4, coupled to each common point of the *n* resistor networks determines when the potentials generated at the summation resistors are minimal and may comprise a combination AND-gate-threshold circuit that produces an output when said potentials generated at the summation resistors lie within prescribed threshold limits. The threshold limits may be supplied to comparison means 4 from storage means 3. Comparison means 4 may additionally include decision logic circuitry, subsequently described.

FIGS. *2a–2d* and 4 illustrate a 4 × 6 matrix of photosensors, which may be present in the converting means for sensing characters to be recognized. Assuming the blocks of FIGS. *2a–2d* take the form of the matrix where each photosensor is numbered as in FIG. 4, and it is further assumed that the numeral 1 is to be sensed, as shown in FIG. *2a*, it will be appreciated that the photo sensors numbered, 4,8,12,16,20 and 24 of converting means 1 would produce signals representing maximum darkness. Photo sensors numbered 1,2,5,9,13,14,17,18,21 and 22 would produce signals representing maximum brightness. Photo sensors 3,6,7,10,11,15,19 and 23 would produce signals representing the proportional amount of darkness detected by each of the said photo sensors. The shape of the character represented by the signals produced by the photo sensor matrix present in converting means 1 is then processed by processing means 2 and compared to all the stored shapes in storage means 3.

Another conventional method of character recognition employing the apparatus of FIG. 1 with slight modifications will now be described. The number of shapes stored in storage means 3 may be reduced from the amount described above by storing only the outlines of known characters. The outlines are shown by the broken lines of FIGS. *2a–2d*. These outlines are stored in the form of signals representing the correlations between matrix elements within the outline and the correlations between matrix elements without the outline. Use of this technique to recognize characters whose features are dissimilar requires determining the correlations in a suitable manner, and, therewith, the geometric properties of the character to be recognized. Processing means 2 correlates the signals produced by the photo sensors of converting means 1 in a well known manner and these correlated signals are compared with the stored correlations. For example, in the case of numeral 1, processing means 2 produces signals indicating the strong correlation of the illumination of matrix elements which are lined up vertically or almost vertically at the right edge of FIG. *2a*. Also, processing means 2 produces signals indicating the strong correlation of the illumination of matrix elements corresponding to the inclined up-stroke of numeral 1. In addition, processing means 2 produces further signals indicating the strong correlation of the mostly blank and therefore bright matrix elements as well as the strong correlation between the bright matrix elements in the upper left hand corner and dark matrix elements in the lower right hand corner for the numeral 1 of FIG. *2a*. These signals compare favorably with the stored outline of numeral 1 in storage means 3 and comparison means 4 would identify the character as a 1.

Figure 2:
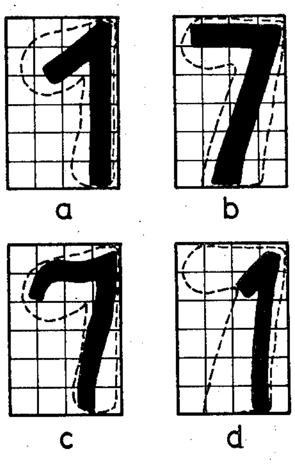

For a further example, in the case of numeral 7, shown in FIG. 2*b*, processing means 2 produces signals indicating the strong correlation of the illumination of the matrix elements lined up horizontally at the upper edge, and signals indicating the strong correlation of the illumination of the matrix elements extending from the right upper corner diagonally downwards. In addition, processing means 2 produces further signals indicating the strong correlation of the mostly blank matrix elements as well as the strong correlation of the dark matrix elements in the upper left hand corner and bright matrix elements in the lower right hand corner.

These signals compare favorably with the outline of numeral 7 which is stored in storage means 3, and comparison means 4 identifies the character as a 7.

It is noted that the outlines of the numerals stored in storage means 3 and indicated by the broken lines of FIGS. 2*a*–2*d* must be broad enough to permit the unknown character to vary in shape but still fall within the outline. FIGS. 2*c* and 2*d* illustrate characters to be detected by the photo sensors of converting means 1, which characters deviate from the standard illustrated in FIGS. 2*b* and 2*a*, respectively. Processing means 2 produces signals indicating the strong correlation of the illumination of the matrix elements of FIG. 2*c*, as described above. These signals fall within the outline of the numeral 1 stored in storage means 3. Accordingly, comparison means 4 will erroneously identify the character as a 1 when it is unequivocally a 7. Likewise, the signals produced by processing means 2 indicating the strong correlation of the matrix elements of FIG. 2*d* will fall within the outline of numeral 7 stored in storage means 3. Comparison means 4 will erroneously identify the character as a 7 when it is unequivocally a 1. Thus, it is seen, that in a conventional character recognition system, a reduction in the amount of shapes to be stored and compared with the unknown character results in a loss in discrimination between different characters exhibiting similar features.

Figure 3:
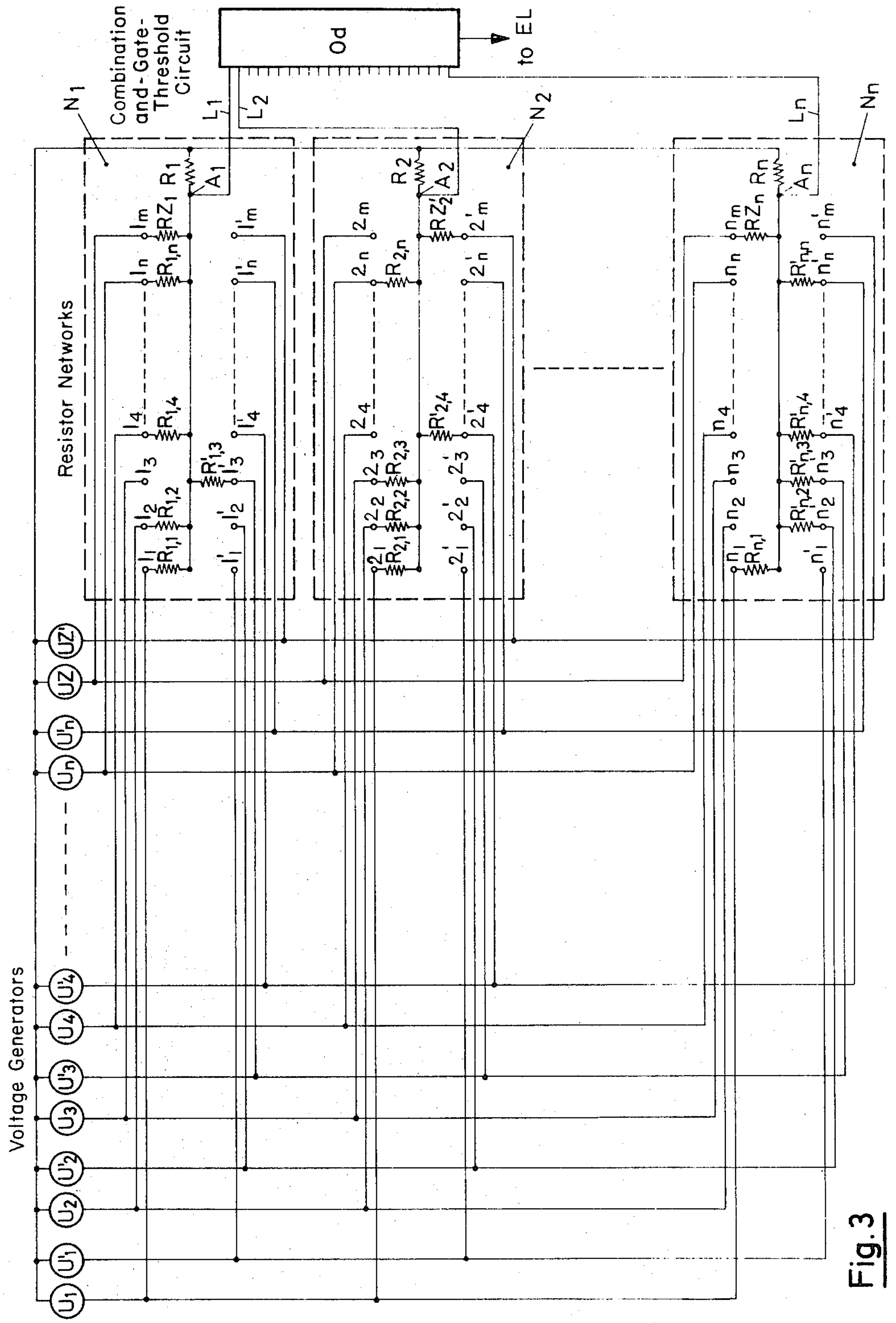
FIG. 3 is a detailed diagram of an exemplary embodiment of a comparator according to the present invention.

Referring now to FIG. 3, a preferred embodiment of a method of comparison and the apparatus therefor, according to the present invention, will be described. The apparatus of FIG. 3 comprises a plurality of voltage generator pairs $U_1$, $U'_1$ . . . $U_n$, $U'_n$, and $U_Z$, $U'_Z$, a plurality of resistor networks $N_1$ . . . $N_n$ and a combination AND-gate threshold circuit O*d*. Each resistor network includes a plurality of pairs of input terminals, $1_1$, $1_1'$–$1_m$, $1'_m$, $2_1$, $2'_1$–$2_m$, $2'_m$ or $n_1$, $n'_1$–$n_m$, $n'_m$ and an output terminal $A_1$, $A_2$ . . . $A_n$. The number of pairs of input terminals is equal to the number of pairs of voltage generators $U_1$, $U_1'$ . . . $U_n$, $U'_n$, $U_Z$, $U_Z'$ so that $m=n+1$. Each pair of input terminals is connected to a pair of voltage generators by the connecting means illustrated. A single combination resistor is associated with each pair of input terminals and is selectively connected from one of said input terminals to the output terminal so that, for example in network $N_1$, $R_{1,1}$ is connected to terminal $1_1$, $R_{1,2}$ is connected to terminal $1_2$ and $R_{1,3}$ is connected to terminal $1'_3$, etc. A further resistor, designated a summation resistor $R_1 - R_N$, is connected from said output terminal to all of said voltage generators in common relationship. The output terminal of each resistor network is connected to combination OR-gate-threshold circuit O*d*.

More specifically, resistor network $N_1$ contains combination resistors $R_{1,1}$ . . . $R_{1,n}$ and summation resistor $R_1$. Resistor network $N_2$ contains combination resistors $R_{2,1}$ . . . $R_{2,n}$ and summation resistor $R_2$. Resistor network $N_n$ contains combination resistors $R_{n,1}$ . . . $R_{n,n}$ and summation resistor $R_n$. Furthermore, the combination resistor $R_{1,1}$ is connected to one terminal $1_1$ of one generator $U_1$ of the pair of voltage generators $U_1$, $U'_1$, combination resistor $R_{1,n}$ is connected to one terminal $1_n$ of one generator $U_n$ of the pair of voltage generators $U_n$, $U_n'$, combination resistor $R_{n,1}$ is connected to one terminal $n_1$ of one generator $U_1$ of the pair of voltage generators $U_1$, $U_1'$, etc. The selection of which generator of the pair of voltage generators to be connected to the combination resistors is described subsequently. The other terminal of each voltage generator is connected in common to each summation resistor, thereby forming a closed loop circuit. The output terminals of the resistor networks $A_1$ . . . $A_n$ are connected by conducting leads $L_1$ . . . $L_n$ to combination AND-gate-threshold circuit O*d*. The output of O*d* may be connected to decision logic EL not shown.

In operation of the comparator of FIG. 3, voltage generators $U_1$, $U_2$, . . . $U_n$ generate distinct voltages. Voltage generators $U_1'$, $U_2'$, . . . $U_n'$ generate voltages equal in magnitude to those generated by corresponding generators $U_1$, $U_2$, . . . $U_n$ respectively, but opposite in phase i.e., 180° out-of-phase, thereto. These voltages may be a.c. voltages preferably having a frequency 1kHz or d.c. voltages of opposite polarity. If d.c. voltages are used, $U_1$, $U_2$, . . . $U_n$ may be considered positive, and $U_1'$, $U_2'$ . . . $U_n'$ negative. Voltages $U_1$, $U_1'$, $U_2$, $U_2'$, . . . $U_n$, $U_n'$ cause currents to flow in combination resistors $R_{1,1}$ . . . $R_{1,m}$, . . . $R_{n,1}$ . . . $R_{n,n}$ in the resistor networks $N_1$, . . . $N_n$. The values of these resistors are determined in a manner subsequently to be described. If the value of a resistor is computed to be negative, the resistor is connected to a negative or oppositely phased voltage generator $U_1'$ . . . $U_n'$. As shown in FIG. 3, combination resistor $R_{1,3}$ was computed to be negative and is therefore connected to voltage generator $U_3'$ at terminal $1'_3$ instead of $U_3$. The primes in each case indicate a negative connection or voltage supply.

The currents through the combination resistors are summed in summation resistors $R_1$ . . . $R_n$ and cause independently derived voltage potentials $U_{S1}$ . . . $U_{Sn}$ to appear at the *n* output terminals $A_1$ . . . $A_n$ of the resistor networks. The values of the resistors $R_{1,1}$, . . . $R_{1,n}$ . . . , $R_{1,n}$ . . . $R_{n,1}$ . . . $R_{n,n}$ are determined in such a manner that these voltage potentials are independently derived and that the standard deviation of each of said independently derived potentials becomes minimal for a predetermined representative sample set of objects corresponding to said predetermined type of objects. These *n* potentials are a measure of the *n* voltages applied to each of the resistor networks. If the *n* potentials are known the voltages may be determined by well-known circuit analysis. Therefore, if the *n* potentials are at predetermined levels, the *n* voltages have satisfied a predetermined condition. Consequently, a comparison between the *n* voltage and a predetermined condition may be made merely by examining the *n* potentials. Combination AND-gate-threshold circuit O*d* examines the *n* independent potentials, thereby comparing the *n* voltages with the predetermined condition. Combination AND-gate-threshold circuit O*d* may be of the well-known type wherein each input potential is compared to two limiting threshold levels and an output is generated only when each input lies within its proper limits.

It is readily apparent that the complexity of combination AND-gate-threshold circuit O*d* will be reduced if each of the predetermined levels of the *n* potentials is permitted to vary between a maximum level and a minimum level about 0 when the *n* voltages satisfy the predetermined condition. This is accomplished by providing an additional pair of oppositely phased voltage generators UZ, UZ' to each of the resistor networks $N_1$ . . . $N_n$, as shown in FIG. 3. One end of each additional resistor $RZ_1$, $RZ_2$, . . . $RZ_n$ is connected to one terminal of voltage generator UZ or UZ' depending upon the computed value of the additional resistor. The other end of each additional resistor is connected to the appropriate output terminal $A_1$, $A_2$, . . . $A_n$. The other terminal of voltage generator UZ or UZ' is connected in common with voltage generators $U_1$ . . . $U_n$, $U'_1$ . . . $U'_n$ as shown in FIG. 3. The values of additional resistors $RZ_1$ . . . $RZ_n$ and the magnitude of the pair of oppositely phased voltage UZ, UZ' are determined such that the *n* predetermined levels of the independent potentials $U_{S1}$ . . . $U_{Sn}$ are constrained to a relatively small interval about 0. The voltages UZ, UZ' may either be d.c., or derived from the oppositely phased voltages $U_1$ . . . $U_n$ and $U'_1$ . . . $U'_n$ (e.g., by summation). The number of limiting threshold levels may be reduced from two to a single 0 level.

Figure 5:
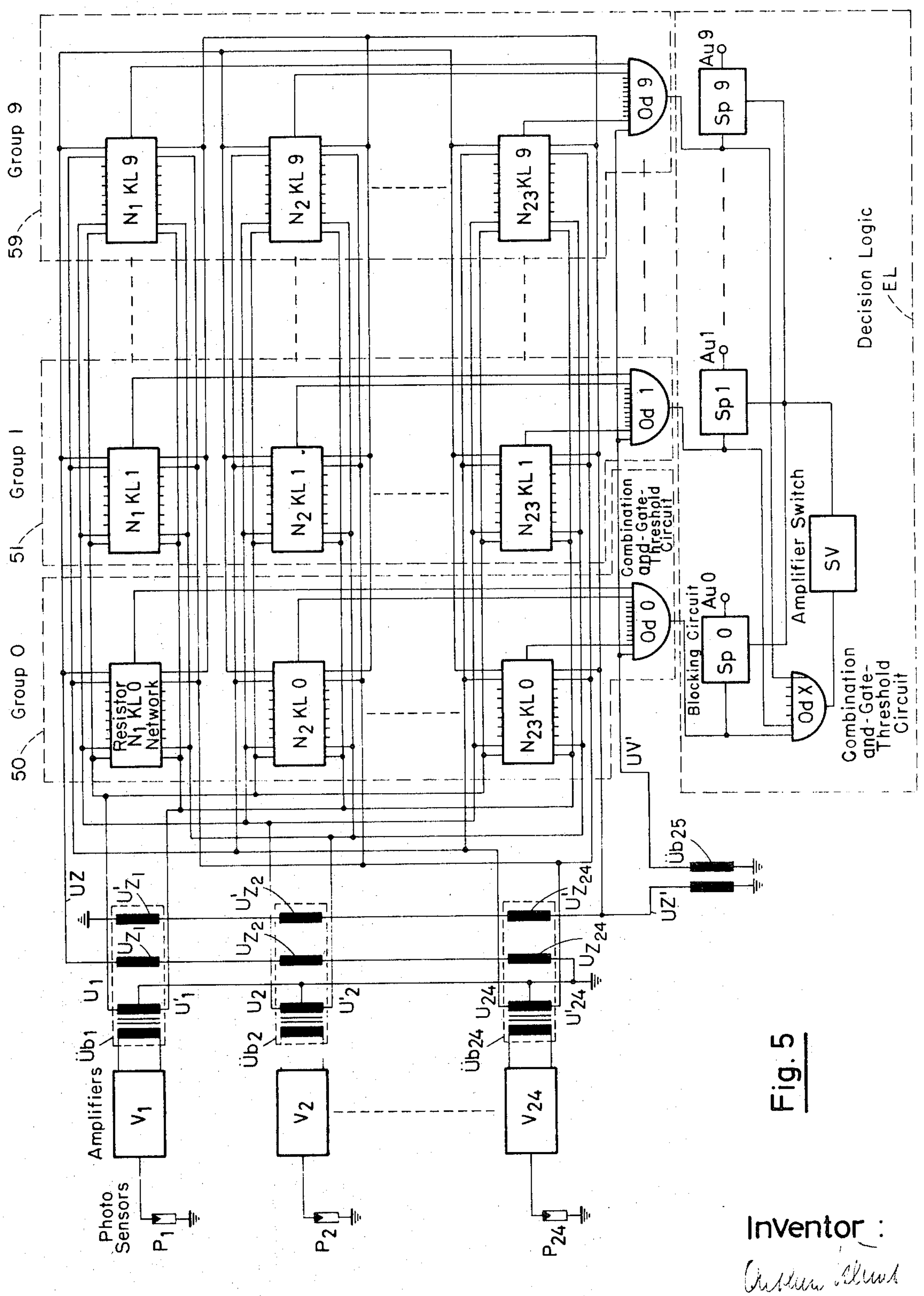
FIG. 5 shows an embodiment of the present invention as used in an optical character recognition system.

FIG. 5 illustrates the use of the comparator according to this invention in a character recognition system. As will be obvious to one of ordinary skill in the art, and as mentioned previously, the comparator has general application and is not limited solely to character recognition. However, in order that the detailed operation of the comparator can be clearly set forth, the identification of characters (e.g., numerals) will be presently considered.

The character recognition system of FIG. 5 comprises photo sensors $P_1$ . . . $P_{24}$, transformers $Ub_1$ . . . $Ub_{24}$, ten groups of comparators 50 . . . 59, and decision logic means EL. Each of the ten groups of comparators 50 . . . 59 is identical to the comparator means illustrated in FIG. 3, and comprises a column of resistor networks $N_1kLO$ . . . $N_{23}kLO$, . . . $N_1kL9$ . . . $N_{23}kL9$. Each resistor network is similar to the resistor networks $N_1$ . . . $N_n$ of FIG. 3. A combination AND-gate-threshold circuit O*d*0 . . . O*d*9 in each column, similar to combination AND-gate-threshold circuit O*d* shown in FIG. 3, is coupled to the resistor networks of that column. The pairs of voltages $U_1$, $U'_1$ . . . $U_n$, $U_n'$ are supplied to the comparators by transformers $Ub_1$ . . . $Ub_{24}$ through the connecting means shown. Each transformer $Ub_1$ . . . $Ub_{24}$ includes one primary coil connected as shown to an associated photo sensor through an amplifier $V_1$ . . . $V_{24}$, and first, second and third secondary coils. The first secondary coil is of the grounded center-tap type. The second secondary coil of each transformer, $U_{Z1}$ . . . $U_{Z24}$, is connected in a first series relationship, the the third secondary coil of each transformer, $U'_{Z1}$ . . . $U'_{Z24}$ is connected in a second series relationship. The output of each comparator 50–59 is generated by the combination AND-gate-threshold circuit therein and is connected to decision logic EL. Decision logic EL comprises a combination AND-gate-threshold circuit OdX coupled to blocking circuits S*p*0 . . . S*p*9 by amplifier switch SV. Each blocking circuit is of the well known type with an input signal input terminal, an inhibit signal input terminal, and an output terminal. A signal applied to the input signal input terminal passes therethrough and appears at the output terminal. However, if an inhibit signal is applied to inhibit signal input terminal, the input signal is inhibited from appearing at the output terminal. Combination AND-gate-threshold circuit O*d*X is coupled to the inhibit signal input terminal of each blocking circuit. The output of each comparator combination AND-gate-threshold circuit is connected to the signal input terminal of one blocking circuit and to combination AND-gate-threshold circuit OdX.

Figure 4:
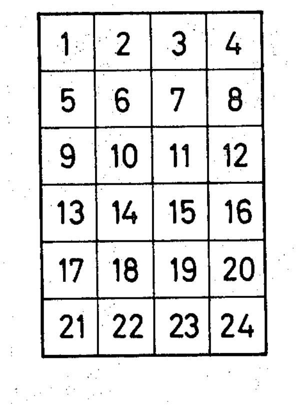
FIG. 4 shows a conventional photo sensor matrix which may be used with the comparator of the invention for identifying optical patterns.

Photo sensors $P_1$ . . . $P_{24}$ may be conventional photo electric diodes arranged in matrix form as illustrated in FIG. 4. Each photo sensor generates a voltage proportional to the degree of darkness reflected upon the individual matrix elements by a character to be identified. After being amplified in amplifiers $V_1$ . . . $V_{24}$, the voltages are applied to individual transformers $Ub_1$ . . . $Ub_{24}$. The first secondary coils of the transformers produce pairs of voltages of opposite phase and hence correspond to the pairs of voltage generators $U_1$, $U_1'$, $U_2$, $U_2'$ . . . $U_{24}$, $U_{24}'$ shown in FIG. 3, wherein *n* equals 24. Thus, each matrix element generates a voltage pair, and each voltage pair represents a sample of the unknown character detected by the photo sensors. The voltage pairs are conducted to the 10 groups of comparators 50 . . . 59. As aforesaid, each group of comparators comprises resistor networks which are identical to resistor networks $N_1$ . . . $N_n$ of FIG. 3. It is seen that there are the same number of groups of comparators as there are numerals. Additional voltages $U_Z$, $U_Z'$ are produced by the series circuits of secondary coils $U_{Z1}$ . . . $U_{Z24}$ and $U'_{Z1}$ . . . $U'_{Z24}$ respectively. These additional voltages are applied to each resistor network in the 10 groups of comparators in the manner described with reference to FIG. 3. The resistor network outputs in each group of comparators are at voltage potentials similar to independent voltage potentials $U_{S1}$ . . . $U_{Sn}$ at output terminals $A_1$ . . . $A_n$ in FIG. 3. These potentials are detected by combination OR-gate-threshold circuits O*d*0 . . . O*d*9. If the unknown character is one of the 10 numerals, the output potentials of the resistor networks in one group of comparators will all be within a predetermined interval about 0. This will be detected by the combination AND-gate-threshold circuit of that comparator.

In order to make the character recognition system as insensitive as possible against variations in the width of the lines of the numerals to be identified, and against changes in supply voltages, the threshold levels of the combination AND-gate-threshold circuits are made dependent upon the magnitude of the voltages UZ. UZ'. This is accomplished by an additional voltage UV' which is derived from voltage UZ' through transformer U*b*25. The primary coil of transformer U*b*25 is connected in shunt relationship with the series connection of third secondary coils $U'_{Z1}$ . . . $U'_{Z24}$. The secondary coil of transformer U*b*25 is connected to an additional input of each combination AND-gate-threshold circuit O*d*0 . . . O*d*9. Voltage UV' sets the threshold level of each combination AND-gate-threshold circuit O*d*0 . . . O*d*9.

Decision logic EL is designed to prevent the possibility of an unknown character being identified as two numerals. As described above, if all the inputs to a combination OR-gate-threshold circuit are within a predetermined interval about 0, that combination AND-gate-threshold circuit will generate an output. This output is applied to a blocking circuit which indicates the identity of the unknown character. As shown in FIG. 5, the output of each combination AND-gate-threshold circuit Od0 . . . Od9 is applied to a further combination AND-gate-threshold circuit OdX. If more than one input is applied to combination AND-gate-threshold circuit OdX, the circuit generates an output which is coupled by amplifier switch SV to the inhibit signal input terminals of blocking circuits Sp0 . . . Sp9 thereby inhibiting each of them from producing an output. Therefore, possible ambiguity in the recognition of a character is eliminated.

Although FIG. 3 shows the same number of resistor networks as there are voltage pairs, namely $n$, FIG. 5 indicates that there is one less resistor network in each comparator than there are voltage pairs. This is possible because the function of one of the n resistor networks of FIG. 3 is to sum the oppositely phased voltages $U_1 \ldots U_{24}$ and $U_1' \ldots U_{24}'$. The summation of these voltages is accomplished by secondary coils $U_{z_1} \ldots U_{z_{24}}$ and $U'_{z_1} \ldots U'_{z_{24}}$, respectively, of FIG. 5. Thus, that one resistor network is redundant and, therefore, not required.

The above description demonstrates that an unknown character is compared with each of the ten numerals, and further classification of the character as one of the numerals results from a favorable comparison. For purposes of illustration, a detailed explanation of the operation of the character of recognition system of FIG. 5 will now be described. As an examplary illustration, it may be assumed that the numeral 1 is detected by the matrix of photo sensors $P_1 \ldots P_{24}$. Voltage pairs $U_1, U_1' \ldots U_{24}, U'_{24}$, corresponding to the relative brightness reflected upon each matrix element by the detected numeral, are generated. These voltages, along with additional voltages UZ, UZ' are applied to each comparator. Although some resistor networks in each comparator may produce output potentials within the prescribed interval about 0 because of the magnitudes of the currents flowing therethrough, only the resistor networks $N_1KL1 \ldots N_{23}KL1$ of comparator 51 will all be within the proper interval. Combination AND-gate-threshold circuit Od1 will produce an output which is applied to the input signal input terminal of blocking circuit Spl and output Aul of blocking circuit Spl will identify the input character as a 1. If an additional combination AND-gate-threshold circuit produces an output, decision logic combination OR-gate-threshold circuit OdX will produce an output signal as aforesaid, which signal will be applied to the inhibit input terminal of each blocking circuit Sp0 . . . Sp9 to inhibit all blocking circuits.

The manner of computing the values of the combination resistors will now be described. Since there are 24 matrix elements $P_1 - P_{24}$ there are 24 combination resistors in each resistor network and 23 resistor networks in each group. Only one group of resistor networks is described below, but the same principles apply to each group.

Figure 6:
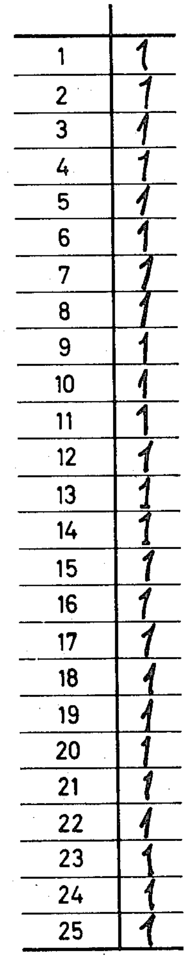
FIG. 6 shows various handwritten samples of the numeral 1.

For each type of numeral a sufficiently large number of samples of handwriting of different persons is taken. FIG. 6 shows 25 samples of the handwritten numeral 1, each sample containing deviations from the others. The total number of samples is denoted by S. The brightness or illumination of the 24 matrix elements is measured by photo sensors as shown in FIG. 4 and discussed above. For each sample there are 24 numbers $x_1^{(1)}, x_2^{(1)} \ldots x_{24}^{(1)}$, which are proportional to the brightness of the 24 matrix elements wherein the superscript denotes the sample, and the subscript denotes the matrix element. $x_1^{(1)} \ldots x_{24}^{(1)}$ denotes the illuminations of matrix elements 1 . . . 24 for the first sample, $x_1^{(2)} \ldots x_{24}^{(2)}$ denotes the illuminations of matrix elements 1 . . . 24 for the second sample, etc.

From the measured illumination the mean values $m_1 \ldots m_{24}$ of the illuminations of the matrix elements 1 . . . 24 are computed according to the formulas:

$$m_1 = 1/S\,(x_1^{(1)} + x_1^{(2)} + \ldots + x_1^{(S)})$$

$$m_2 = 1/S\,(x_2^{(1)} + x_2^{(2)} + \ldots + x_2^{(S)})$$

.
.
.

$$m_{24} = 1/S\,(x_{24}^{(1)} + x_{24}^{(2)} + \ldots + x_{24}^{(S)})$$

Using the computed mean values, derived features are formed according to the invention, i.e. combinations $$\delta = \alpha_1(x_1 - m_1) + \alpha_2(x_2 - m_2) + \ldots + \alpha_{24}(x_{24} - m_{24})$$

of the original features, i.e. of the illuminations $x_1, x_2 \ldots x_{24}$ with the following properties: For each sample $x_1^{(l)}, x_2^{(l)} \ldots x_{24}^{(l)}$ such a combination has the value $$\delta^{(l)} = \alpha_1\,(x_1^{(l)} - m_1) + \alpha_2(x_2^{(l)} - m_2) + \ldots + \alpha_{24}(x_{24}^{(l)} - m_{24})$$

Taking the average over all samples the sum of the square $$F = \sum_{l=1}^{S} [\delta^{(l)}]^2,$$

i.e. the statistical standard deviation of the combinations has to become a minimum, i.e. the standard deviations of the values of the derived features have to become minimal for the representatives of the group.

Excluding the trivial solution $\alpha_1 = \alpha_2 = \ldots \alpha_{24} = 0$ by $\alpha_1^2 + \alpha_2^2 + \ldots + \alpha_{24}^2 = \text{const} = \sigma$ the following minimal condition results: The function $$F = [\alpha_1\,(x_1^{(1)} - m_1) + \alpha_2(x_2^{(1)} - m_2) + \ldots + \alpha_{24}\,(x_{24}^{(1)} - m_{24})]^2$$
$$+ [\alpha_1(x_1^{(2)} - m_1) + \alpha_2(x_2^{(2)} - m_2) + \ldots + \alpha_{24}(x_{24}^{(2)} - m_{24})]^2$$

.
.
.

$$+ [\alpha_1(x_1^{(S)} - m_1) + \alpha_2(x_2^{(S)} - m_2) + \ldots + \alpha_{24}(x_{24}^{(S)} - m_{24})]^2$$
$$+ \sigma(\alpha_1^2 + \alpha_2^2 + \ldots + \alpha_{24}^2)$$

shall become minimal as a function of the coefficients $\alpha_1, \alpha_2, \ldots \alpha_{24}$. Necessary for the existence of the minima is $$\partial F/\partial\alpha_1 = \partial F/\partial\alpha_2 = \ldots = \partial F/\partial\alpha_{24} = \partial F/\partial\sigma = 0$$

wherefrom follows:

$$\partial F/\partial\alpha_1 = 2\{[\alpha_1(x_1^{(1)} - m_1) + \alpha_2(x_2^{(1)} - m_2) + \ldots + \alpha_{24}(x_{24}^{(1)} - m_{24})](x_1^{(1)} - m_1)$$
$$+ [\alpha_1(x_1^{(2)} - m_1) + \alpha_2(x_2^{(2)} - m_2) + \ldots + \alpha_{24}(x_{24}^{(2)} - m_{24})](x_1^{(2)} - m_1)$$

.

.

.

$+ [\alpha_1(x_1^{(S)}-m_1) + \alpha_2(x_2^{(S)}-m_2) + \ldots + \alpha_{24}(x_{24}^{(S)}-m_{24})](x_1^{(S)}-m_1)\}$
$- 2\sigma\alpha_1 = 0$

.

.

.

$\partial F/\partial \alpha = 2\{[\alpha_1(x_1^{(1)}-m_1) + \alpha_2(x_2^{(1)}-m_2) + \ldots + \alpha_{24}(x_{24}^{(1)}-m_{24})](x_{24}^{(1)}-m_{24})$
$+ [\alpha_1(x_1^{(2)}-m_1) + \alpha_2(x_2^{(2)}-m_2) + \ldots + \alpha_{24}(x_{24}^{(2)}-m_{24})](x_{24}^{(2)}-m_{24})$

.

.

.

$+ [\alpha_1(x_1^{(S)}-m_1) + \alpha_2(x_2^{(S)}-m_2) + \ldots + \alpha_{24}(x_{24}^{(S)}-m_{24})](x_{24}^{(S)}-m_{24})\}$
$- 2\sigma\alpha_{24} = 0$ Using the definition $$\lambda_{i,k} = \frac{1}{S}\sum_{j=1}^{S}(x_i^{(j)}-m_i)(x_k^{(j)}-m_k) \quad (1)$$

the above conditions can be written as follows, after multiplication of the brackets with their factors and after summation of the terms in a row: (The $\lambda_{i,k}$ are elements of the covariance matrix)

$\alpha_1\lambda_{1,1}+\alpha_2\lambda_{1,2}+ \ldots + \alpha_{24}\lambda_{1,24} = \sigma\alpha_1$
$\alpha_1\lambda_{2,1}+\alpha_2\lambda_{2,2} + \ldots + \alpha_{24}\lambda_{2,24} = \sigma\alpha_2$

.

.

.

$\alpha_1\lambda_{24,1}+\alpha_2\lambda_{24,2}+ \ldots + \alpha_{24}\lambda_{24,24} = \sigma\alpha_{24} \quad (2)$ or in matrix form $\Lambda\alpha=\sigma\alpha$ with covariance matrix $$\Lambda = \begin{pmatrix} \lambda_{1,1} & \ldots & \lambda_{1,24} \\ \cdot & & \cdot \\ \cdot & & \cdot \\ \cdot & & \cdot \\ \lambda_{24,1} & \ldots & \lambda_{24,24} \end{pmatrix}; \quad \alpha = \begin{pmatrix} \alpha_1 \\ \alpha_2 \\ \cdot \\ \cdot \\ \cdot \\ \alpha_{24} \end{pmatrix}$$

The matrix equation (2) has 24 linear independent solutions $\{\alpha_1^{(1)}, \alpha_2^{(1)}, \ldots, \alpha_{24}^{(1)}\}, \{\alpha_1^{(2)}, \alpha_2^{(2)}, \ldots, \alpha_{24}^{(2)}\}, \ldots$
$\{\alpha_1^{(24)}, \alpha_2^{(24)}, \ldots, \alpha_{24}^{(24)}\}$ (which are distinguished by the upper index), which can be determined by one of the known methods for the determination of eigenvectors of a matrix (e.g. Jacobi-Rotation).

In the illustrated example the illuminations $x_1/.X$ $x_2.X. \ldots, x_{24}/X.$ are used, where X is the sum $x_1 + x_2 \ldots + x_{24}$. Therefore, one linear-combination is already used, so that only 23 linear independent solutions are left.

In order to find the solutions, it is necessary, at first, to compute the covariance matrix $\Lambda$ according to its definition, i.e.

$\lambda_{1,1}=1/S\,[(x_1^{(1)}-m_1)^2+(x_1^{(2)}-m_1)^2+\ldots+(x_1^{(S)}-m_1)^2]$
$\lambda_{1,2}=1/S\,[(x_1^{(1)}-m_1)(x_2^{(1)}-m_2) + (x_1^{(2)}-m_1)(x_2^{(2)}-m_2) + \ldots$
$+(x_1^{(S)}-m_1)(x_2^{(S)}-m_2)]$ etc. After computation of the 23 solutions $\{\alpha_1^{(1)}, \alpha_2^{(1)}, \ldots, \alpha_{24}^{(1)}\}, \{\alpha_1^{(2)}, \alpha_2^{(2)}, \ldots, \alpha_{24}^{(2)}\}, \ldots$
$\{\alpha_1^{(23)}, \alpha_2^{(23)}, \ldots, \alpha_{24}^{(23)}\}$ of the matrix equation (2) the maximum of the absolute value of each of the independent resulting combinations $\delta_1=\alpha_1^{(1)}(x_1-m_1)+\alpha_2^{(1)}(x_2-m_2) + \ldots + \alpha_{24}^{(1)}(x_{24}-m_{24})$

.

.

.

$\delta_{23}=\alpha_1^{(23)}(x_1-m_1) + \alpha_2^{(23)}(x_2-m_2) + \ldots + \alpha_{24}^{(23)}(x_{24}-m_{24})$ has to be computed, which is obtained, if for $x_1, x_2, \ldots x_{24}$ the values corresponding to all used samples are substituted. Hereby the limits are determined, between which the derived features vary for the representatives of the group used. For determination of the maxima the values of the combinations $\delta_1, \delta_2, \ldots \delta_{23}$ must be computed for each sample.

From the first sample one obtains $\delta_1^{(1)}= \alpha_1^{(1)}(x_1^{(1)}-m_1) +\alpha_2^{(1)}(x_2^{(1)}-m) + \ldots + \alpha_{24}^{(1)}(x_{24}^{(1)}-m_{24})$

.

.

.

$\delta_{23}^{(1)}=\alpha_1^{(23)}(x_1^{(1)}-m_1) +\alpha_2^{(23)}(x_2^{(1)}-m) + \ldots +\alpha_{24}^{(23)}(x_{24}^{(1)}-m_{24}),$ for the second sample the upper index of $x_1, x_2, \ldots x_{24}$ is a 2, etc. Thus for S samples there are 23 sets $\{\delta_1^{(1)}, \delta_1^{(2)}, \ldots, \delta_1^{(S)}\}, \{\delta_2^{(1)}, \delta_2^{(2)}, \ldots, \delta_2^{(S)}\}, \ldots$
$\{\delta_{23}^{(1)}, \delta_{23}^{(2)}, \ldots \delta_{23}^{(S)}\}$ of S numbers, from each of which the largest in absolute value has to be chosen. The numbers determine the intervals, within which the voltages US may vary at the summation resistors.

From the computed values $m_1, m_2, \ldots m_{24}$ and $\alpha_1^{(1)}, \alpha_2^{(1)}, \ldots \alpha_{24}^{(23)}$ the values of the resistors of the networks $N_1, N_2, \ldots N_{23}$ are obtained as follows:

The reciprocals of the numbers $\alpha_1^{(1)}, \alpha_2^{(1)}, \ldots \alpha_{24}^{(1)}$ are proportional to the values of the combination resistors $R_{1,1}, R_{1,2}, \ldots R_{1,24}$ or $R_{1,1}', R_{1,2}', \ldots R_{1,24}'$ of the network $N_1$, the reciprocals of $\alpha_1^{(2)}, \alpha_2^{(2)}, \ldots \alpha_{24}^{(2)}$ are proportional to the values of the resistors $R_{2,1}, R_{2,2}, \ldots R_{2,24}$ or $R_{2,1}', R_{2,2}', \ldots R_{2,24}'$ of the network $N_2$, etc.. The reciprocal value of $\alpha_1^{(1)} m_1+\alpha_2^{(1)}m_2+ \ldots +\alpha_{24}^{(1)}m_{24} =\beta_1$ is proportional to the value of the additional resistor $RZ_1$ or $RZ_1'$ in the network $N_1$, etc.

If the computed numbers $\alpha_i^{(k)}$ are positive, the corresponding combination resistors $R_{i,k}$ shown in FIG. 3 are connected to voltage generators $U_1 \ldots U_{24}$. If the numbers are negative, the combination resistors are connected to generators $U_1' \ldots U_{24}'$. If $\beta_i$ is positive, resistor $RZ_i'$ is connected to additional voltage generator UZ. If $\beta_i$ is negative, resistor $RZ_i$ is connected to generator UZ.

Numerical results of the measurements and computations explained above are reproduced in tables I and II for the case of numeral 1. Table I shows the illuminations of the 24 matrix elements for each of the 25 samples. The value 0 corresponds to complete darkness, the value 100 corresponds to maximum illumination. Table II shows the value of the the combination resistors in K-ohm, for the networks $N_1$, $N_2$ and $N_3$ of the comparator corresponding to the numeral 1.

TABLE I

| Number of samples | Grid elements | | | | | | | | | | | | | | | | | | | | | | | |
|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | 81 | 84 | 92 | 37 | 79 | 91 | 45 | 40 | 76 | 93 | 90 | 42 | 78 | 93 | 43 | 81 | 72 | 90 | 82 | 34 | 80 | 89 | 78 | 55 |
| 2 | 88 | 78 | 87 | 31 | 88 | 90 | 74 | 37 | 79 | 86 | 66 | 40 | 80 | 86 | 42 | 56 | 84 | 81 | 47 | 34 | 85 | 78 | 32 | 58 |
| 3 | 86 | 78 | 93 | 34 | 88 | 90 | 84 | 38 | 84 | 88 | 78 | 38 | 71 | 86 | 26 | 70 | 76 | 86 | 62 | 32 | 92 | 85 | 56 | 63 |
| 4 | 86 | 76 | 88 | 58 | 80 | 86 | 86 | 49 | 62 | 84 | 83 | 46 | 74 | 84 | 35 | 82 | 76 | 80 | 78 | 34 | 78 | 78 | 72 | 60 |
| 5 | 88 | 74 | 89 | 35 | 88 | 88 | 80 | 34 | 83 | 86 | 72 | 35 | 78 | 84 | 29 | 53 | 84 | 80 | 37 | 56 | 86 | 78 | 40 | 80 |
| 6 | 82 | 82 | 94 | 46 | 84 | 94 | 80 | 55 | 80 | 97 | 76 | 60 | 74 | 95 | 48 | 67 | 78 | 92 | 65 | 40 | 80 | 92 | 76 | 74 |
| 7 | 90 | 80 | 87 | 46 | 92 | 91 | 81 | 30 | 88 | 92 | 77 | 34 | 85 | 88 | 33 | 58 | 87 | 83 | 45 | 28 | 86 | 83 | 32 | 57 |
| 8 | 84 | 82 | 98 | 36 | 82 | 93 | 90 | 38 | 80 | 92 | 82 | 44 | 68 | 87 | 36 | 62 | 82 | 84 | 46 | 40 | 87 | 83 | 30 | 76 |
| 9 | 90 | 80 | 94 | 37 | 90 | 92 | 88 | 34 | 60 | 90 | 85 | 36 | 68 | 89 | 33 | 82 | 89 | 85 | 80 | 33 | 90 | 84 | 76 | 52 |
| 10 | 89 | 76 | 98 | 44 | 87 | 82 | 89 | 48 | 80 | 84 | 88 | 52 | 89 | 84 | 43 | 85 | 82 | 82 | 83 | 37 | 80 | 84 | 94 | 76 |
| 11 | 91 | 80 | 53 | 69 | 90 | 92 | 49 | 77 | 76 | 92 | 48 | 70 | 70 | 90 | 44 | 42 | 88 | 86 | 44 | 50 | 88 | 84 | 73 | 88 |
| 12 | 90 | 82 | 92 | 36 | 92 | 92 | 86 | 31 | 84 | 92 | 82 | 34 | 78 | 90 | 22 | 61 | 90 | 86 | 41 | 54 | 90 | 88 | 64 | 88 |
| 13 | 92 | 78 | 75 | 38 | 94 | 92 | 60 | 56 | 88 | 92 | 54 | 54 | 82 | 89 | 26 | 46 | 84 | 85 | 42 | 54 | 87 | 86 | 58 | 83 |
| 14 | 85 | 82 | 81 | 62 | 84 | 98 | 72 | 62 | 80 | 98 | 68 | 66 | 87 | 98 | 60 | 63 | 82 | 98 | 60 | 36 | 80 | 98 | 53 | 84 |
| 15 | 95 | 82 | 88 | 24 | 99 | 94 | 78 | 30 | 88 | 94 | 66 | 34 | 84 | 92 | 30 | 47 | 92 | 88 | 30 | 34 | 92 | 89 | 74 | 72 |
| 16 | 92 | 82 | 96 | 32 | 94 | 95 | 90 | 38 | 88 | 94 | 84 | 37 | 63 | 92 | 24 | 72 | 91 | 88 | 69 | 36 | 88 | 87 | 86 | 74 |
| 17 | 94 | 83 | 97 | 57 | 97 | 94 | 90 | 40 | 90 | 93 | 83 | 36 | 91 | 92 | 28 | 59 | 92 | 90 | 42 | 50 | 90 | 92 | 62 | 91 |
| 18 | 91 | 80 | 82 | 38 | 86 | 92 | 80 | 42 | 78 | 92 | 66 | 36 | 90 | 90 | 26 | 44 | 92 | 86 | 32 | 67 | 89 | 87 | 60 | 87 |
| 19 | 88 | 83 | 98 | 34 | 90 | 96 | 86 | 37 | 86 | 96 | 80 | 30 | 88 | 92 | 28 | 64 | 89 | 88 | 55 | 54 | 83 | 92 | 80 | 83 |
| 30 | 98 | 88 | 98 | 31 | 98 | 98 | 89 | 35 | 97 | 96 | 85 | 36 | 94 | 93 | 28 | 78 | 92 | 87 | 72 | 36 | 88 | 87 | 81 | 70 |
| 21 | 92 | 81 | 95 | 32 | 88 | 93 | 85 | 35 | 83 | 93 | 77 | 38 | 90 | 92 | 22 | 54 | 92 | 90 | 42 | 52 | 89 | 88 | 79 | 79 |
| 22 | 90 | 75 | 85 | 41 | 80 | 90 | 80 | 40 | 83 | 92 | 77 | 34 | 84 | 94 | 34 | 64 | 83 | 93 | 50 | 71 | 84 | 95 | 78 | 94 |
| 23 | 87 | 76 | 46 | 72 | 88 | 88 | 54 | 62 | 58 | 86 | 52 | 53 | 82 | 86 | 22 | 46 | 85 | 82 | 43 | 48 | 85 | 82 | 72 | 77 |
| 24 | 83 | 74 | 88 | 38 | 90 | 85 | 84 | 41 | 67 | 82 | 78 | 38 | 78 | 84 | 25 | 76 | 88 | 82 | 66 | 44 | 90 | 82 | 80 | 77 |
| 25 | 82 | 72 | 70 | 55 | 78 | 80 | 68 | 56 | 68 | 79 | 63 | 56 | 56 | 81 | 37 | 51 | 74 | 76 | 38 | 60 | 73 | 74 | 50 | 96 |

TABLE II

+ Resistor values in kΩ of the networks N1KL1 . . . N23KL1 for classification of numeral 1

| Network N 1 KL 1 | | | | Network N 2 KL 1 | | | | Network N 3 KL 1 | | | |
|---|---|---|---|---|---|---|---|---|---|---|---|
| $R_{1,1}$ | 4,780 | $R'_{1,1}$ | ------ | $R_{2,1}$ | 9,390 | $R'_{2,1}$ | ------ | $R_{3,1}$ | ------ | $R'_{3,1}$ | 1,208 |
| $R_{1,2}$ | 4,020 | $R'_{1,2}$ | ------ | $R_{2,2}$ | 3,840 | $R'_{2,2}$ | ------ | $R_{3,2}$ | 2,120 | $R'_{3,2}$ | ------ |
| $R_{1,3}$ | ------ | $R'_{1,3}$ | 2,860 | $R_{2,3}$ | 6,320 | $R'_{2,3}$ | ------ | $R_{3,3}$ | 4,240 | $R'_{3,3}$ | ------ |
| $R_{1,4}$ | 3,380 | $R'_{1,4}$ | ------ | $R_{2,4}$ | ------ | $R'_{2,4}$ | 3,620 | $R_{3,4}$ | 5,080 | $R'_{3,4}$ | ------ |
| $R_{1,5}$ | 4,940 | $R'_{1,5}$ | ------ | $R_{2,5}$ | 8,410 | $R'_{2,5}$ | ------ | $R_{3,5}$ | ------ | $R'_{3,5}$ | 1,800 |
| $R_{1,6}$ | 5,670 | $R'_{1,6}$ | ------ | $R_{2,6}$ | 1,660 | $R'_{2,6}$ | ------ | $R_{3,6}$ | 7,570 | $R'_{3,6}$ | ------ |
| $R_{1,7}$ | ------ | $R'_{1,7}$ | 3,100 | $R_{2,7}$ | 8,870 | $R'_{2,7}$ | ------ | $R_{3,7}$ | 7,840 | $R'_{3,7}$ | ------ |
| $R_{1,8}$ | 3,060 | $R'_{1,8}$ | ------ | $R_{2,8}$ | ------ | $R'_{2,8}$ | 3,150 | $R_{3,8}$ | ------ | $R'_{3,8}$ | 4,420 |
| $R_{1,9}$ | 8,710 | $R'_{1,9}$ | ------ | $R_{2,9}$ | 4,290 | $R'_{2,9}$ | ------ | $R_{3,9}$ | 4,480 | $R'_{3,9}$ | ------ |
| $R_{1,10}$ | 3,640 | $R'_{1,10}$ | ------ | $R_{2,10}$ | 1,920 | $R'_{2,10}$ | ------ | $R_{3,10}$ | 4,920 | $R'_{3,10}$ | ------ |
| $R_{1,11}$ | ------ | $R'_{1,11}$ | 3,140 | $R_{2,11}$ | 3,110 | $R'_{2,11}$ | ------ | $R_{3,11}$ | 1,030 | $R'_{3,11}$ | ------ |
| $R_{1,12}$ | 3,670 | $R'_{1,12}$ | ------ | $R_{2,12}$ | ------ | $R'_{2,12}$ | 2,910 | $R_{3,12}$ | 7,360 | $R'_{3,12}$ | ------ |
| $R_{1,13}$ | 2,550 | $R'_{1,13}$ | ------ | $R_{2,13}$ | 5,040 | $R'_{2,13}$ | ------ | $R_{3,13}$ | 4,970 | $R'_{3,13}$ | ------ |
| $R_{1,14}$ | 4,110 | $R'_{1,14}$ | ------ | $R_{2,14}$ | 3,100 | $R'_{2,14}$ | ------ | $R_{3,14}$ | ------ | $R'_{3,14}$ | 1,190 |
| $R_{1,15}$ | 9,440 | $R'_{1,15}$ | ------ | $R_{2,15}$ | ------ | $R'_{2,15}$ | 3,470 | $R_{3,15}$ | 2,330 | $R'_{3,15}$ | ------ |
| $R_{1,16}$ | ------ | $R'_{1,16}$ | 2,900 | $R_{2,16}$ | ------ | $R'_{2,16}$ | 4,380 | $R_{3,16}$ | 4,060 | $R'_{3,16}$ | ------ |
| $R_{1,17}$ | 2,320 | $R'_{1,17}$ | ------ | $R_{2,17}$ | 5,610 | $R'_{2,17}$ | ------ | $R_{3,17}$ | ------ | $R'_{3,17}$ | 1,040 |
| $R_{1,18}$ | 3,840 | $R'_{1,18}$ | ------ | $R_{2,18}$ | 3,650 | $R'_{2,18}$ | ------ | $R_{3,18}$ | ------ | $R'_{3,18}$ | 5,820 |
| $R_{1,19}$ | ------ | $R'_{1,19}$ | 2,970 | $R_{2,19}$ | ------ | $R'_{2,19}$ | 2,220 | $R_{3,19}$ | ------ | $R'_{3,19}$ | 1,280 |
| $R_{1,20}$ | 4,090 | $R'_{1,20}$ | ------ | $R_{2,20}$ | 3,600 | $R'_{2,20}$ | ------ | $R_{3,20}$ | ------ | $R'_{3,20}$ | 2,590 |
| $R_{1,21}$ | 4,950 | $R'_{1,21}$ | ------ | $R_{2,21}$ | 7,620 | $R'_{2,21}$ | ------ | $R_{3,21}$ | ------ | $R'_{3,21}$ | 2,310 |
| $R_{1,22}$ | 3,980 | $R'_{1,22}$ | ------ | $R_{2,22}$ | 1,800 | $R'_{2,22}$ | ------ | $R_{3,22}$ | ------ | $R'_{3,22}$ | 3,890 |
| $R_{1,23}$ | ------ | $R'_{1,23}$ | 7,760 | $R_{2,23}$ | ------ | $R'_{2,23}$ | 7,630 | $R_{3,23}$ | ------ | $R'_{3,23}$ | 1,280 |
| $R_{1,24}$ | 3,590 | $R'_{1,24}$ | ------ | $R_{2,24}$ | 4,280 | $R'_{2,24}$ | ------ | $R_{3,24}$ | ------ | $R'_{3,24}$ | 7,190 |
| $R_{Z1}$ | ------ | $R'_{Z1}$ | 1,720 | $R_{Z2}$ | 8,670 | $R'_{Z2}$ | ------ | $R_{Z3}$ | ------ | $R'_{Z3}$ | 4,550 |

Although the comparator adapted for use in a character recognition system has been described with reference to numeral identification, voltages $U_1$ . . . $U_n$ can represent other physical features. Thus, temperatures may be identified by replacing the photo sensors $P_1$ . . . $P_n$ of FIG. 5 with heat sensors. Also, other transducers such as sound, vibration, acceleration and pressure transducers, may be used. Thus, the term "character recognition" is defined as the identification of an unknown object as being one of a plurality of predetermined types.

Also, the number of comparators may be increased to identify a larger number of types of objects. For example, the letters of the alphabet would require 26 comparators. Similarly, the number of resistor networks in each comparator would depend upon the number of physical features that are to be detected for identification. If only 10 features need be detected, as where there are only 10 matrix elements in an optical system, then each comparator would contain 10 resistor networks; if 50 features need be detected, then each comparator would contain 50 resistor networks.

While the invention has been particularly shown and described with reference to a specific embodiment thereof, it will be obvious to those skilled in the art that the foregoing and various other changes and modifications in form and details may be made therein without departing from the spirit and scope of the invention. It is, therefore, the aim of the appended claims to cover all such changes and modifications.

What is claimed is:

1. The method of comparing an unknown condition with a plurality of predetermined conditions comprising the steps of:

generating a plurality of voltages in response to the condition to be compared;

producing a plurality of groups of independent potential levels, each of said groups being associated with a predetermined condition and each of said independent potential levels in each group having minimal standard deviation for a predetermined representative sample set of objects of predetermined type, and each said independent potential level being derived from said plurality of voltages;

comparing each independent potential level in each group with predetermined threshold levels; and indicating a favorable comparison between the independent potential levels of one group and said predetermined threshold levels when each of said independent potential levels in said one group is within said predetermined threshold levels.

2. The method of claim 1 wherein said step of producing a plurality of groups of independent potential levels comprises the steps of:

generating a plurality of subgroups of currents in each group in response to said plurality of voltages;

generating a plurality of groups of currents by summing the currents in each subgroup of currents in each group, and producing said plurality of groups of independent potential levels from said plurality of groups of currents.

3. The method of recognizing an unknown character as being one of a number of predetermined types comprising the steps of:

detecting the unknown character and producing indications thereof;

generating a first plurality of voltages in response to said produced indications;

generating a second plurality of voltages proportional to said first plurality of voltages;

producing a plurality of groups of independent potential levels responsive to said second plurality of voltages, each of said groups being associated with a predetermined type of character and each of said independent potential levels in each group being dervied from said second plurality of voltages;

comparing each independent potential level in each group with predetermined levels;

indicating a favorable comparison between all of said independent potential levels in one of said groups and said predetermined levels; and preventing more than one favorable comparison of a group of independent potential levels.

4. The method of claim 3 wherein said step of producing a plurality of groups of independent potential levels comprises the steps of:

generating groups of a first plurality of currents proportional to said second plurality of voltages;

summing said first plurality of currents to form corresponding groups of a second plurality of currents;

and producing said groups of independent potential levels from said second plurality of currents.

5. The method of claim 4 wherein said groups are equal in number to the number of predetermined types.

6. The method of claim 5 wherein said step of generating groups of a first plurality of currents comprises applying said second plurality of voltages to a plurality of groups of resistor networks, each resistor network comprising a plurality of resistors, such that said first plurality of currents flow in said plurality of resistors, and wherein the number of resistor networks in each group is approximately equal to the number of said second plurality of voltages.

7. The method of claim 6 wherein said step of summing said first plurality of currents comprises applying said first plurality of currents that flow in said plurality of resistors in each resistor network to a summation resistor in said resistor network, and wherein each said resistor network produces a corresponding independent potential level.

8. The method of claim 7 wherein the values of said plurality of groups of resistors are predetermined in such a way, that the standard deviation of each of said independent potential levels generated at said summation resistor becomes minimal for a predetermined representative sample set of objects of predetermined type.

9. The method of claim 7 wherein said step of comparing said independent potential levels comprises applying each independent potential level in each group to an AND-gate-threshold circuit associated with that group, and wherein said AND-gate-threshold circuit has a threshold level determined by said second plurality of voltages such that said predetermined levels are constrained to a relatively small interval about a value.

10. The method of claim 9 wherein said step of preventing more than one favorable comparison comprises the steps of applying the output from each combination AND gate-threshold circuit to an associated blocking circuit and to a further combination AND gate-threshold circuit, and applying an output from said further AND gate-threshold circuit to each said associated blocking circuit, there by inhibiting each blocking circuit from producing an output; and wherein said first plurality of voltages is equal in number to said resistor networks in each said group.

11. In character recognition apparatus for identifying an unknown character whose features may vary as being one of a predetermined plurality of types, said character recognition apparatus including photosensor means for detecting said unknown character and generating voltages in response thereto, the improvement comprising:

a plurality of groups of network means, each group corresponding to a predetermined type and comprising plural networks, each network producing an independent potential level;

said plural networks each including plural resistance means having values predetermined in such a way, that the standard deviation of each of said independent potential levels becomes minimal for a predetermined representative sample set of objects of each type;

means coupling said generated voltages to said resistance means;

threshold circuit means in each group for comparing each produced independent potential level to predetermined threshold levels;

first means responsive to said threshold circuit means for indicating the identity of said unknown character; and second means responsive to said threshold circuit means for preventing more than one indication of the identity of said unknown character by said first means responsive to said threshold circuit means.

12. The improvement of claim 11 wherein said first means responsive to said threshold circuit means indicates the identity of said unknown character when the standard deviations of said independent potential levels are within predetermined thresholds.

13. The improvement of claim 12 wherein said resistance means in each said network comprises a plurality of resistors equal in number to the number of said generated voltages, and said resistors are coupled at one end thereof to said generated voltages by a plurality of terminal pairs, said terminal pairs being equal in number to the number of said resistors, and at another end thereof to a common output terminal.

14. The improvement of claim 13 wherein said threshold circuit means in each group comprises a combination AND gate-threshold circuit whose threshold level is proportional to said generated voltages such that said predetermined levels are constrained to a relatively small interval about a value; said combination AND gate-threshold circuit being coupled to each said common output terminal in said group.

15. The improvement of claim 14 wherein said first means responsive to said threshold circuit means comprises a plurality of blocking circuits, each said blocking circuit connected to a combination AND gate-threshold circuit; and wherein said second means responsive to said threshold circuit means comprises a further combination AND gate-threshold circuit having a plurality of inputs connected to said combination AND gate-threshold circuits, and having an output connected to said blocking circuits whereby said blocking circuits are activated to inhibit said indication of the identity of said unknown character upon the generation of a signal by said further combination AND gate-threshold circuit.

16. The method of classifying an unknown condition represented by n features which are subject to variations comprising the steps of:

generating n electrical quantities proportional to said n features;

deriving two oppositely phased voltages from each of said n electrical quantities;

applying said oppositely phased voltages to a plurality of groups of n resistor networks, each group of n resistor networks representing a classification of conditions, and each resistor network comprising a plurality of resistors, the values of which are established in accordance with the eigenvectors of the covariancematrix ascertained by predetermined variations among conditions of a classification such that the resistors of the ith resistor network in a group corresponding to said classification are proportional to the components of the ith eigenvector of the covariancematrix;

generating a plurality of independent potential levels in said groups of n resistor networks such that the standard deviations of the values of the independent potential levels generated in one said group are minimal when said unknown condition corresponds to the condition represented by said group;

and determining whether said independent potential levels generated in each group lie within predetermined limits.

17. Apparatus for classifying an unknown condition represented by n features which are subject to variations as being one of a predetermined type comprising:

means for generating n electrical quantities proportional to said n features;

means coupled to said means for generating for deriving two oppositely phased voltages from each of said n electrical quantities;

a plurality of groups of n resistor networks, each of said groups representing a predetermined type of condition, wherein each of said resistor networks in each of said groups comprises n combination resistors and a summation resistor connected to a common point whereat potential levels are produced, said summation resistors in each group being connected in common relationship; said combination resistors of said n resistor networks in a group having values established in accordance with the eigenvectors of the covariancematrix ascertained by predetermined variations among the type of condition represented by said group, such that the resistors of the ith resistor network in said group are proportional to the components of the ith eigenvector of the covariancematrix whereby said potential levels are independent of each other and the standard deviations thereamong are minimal when said unknown condition corresponds to the type represented by said group;

means for coupling said means for deriving to said combination resistors such that each of said combination resistors has a derived voltage applied thereto;

means associated with each said group and coupled to said common points therein for determining whether said potential levels produced thereat lie within prescribed limits; and means coupled to said means for determining for indicating the outputs produced thereby.

18. The apparatus of claim 17 wherein said common point has connected thereto one terminal of an additional resistor, the other terminal thereof adapted to be supplied with an additional voltage derived from said oppositely phased voltages whereby said prescribed limits comprises a relatively small interval about a zero level.

19. A comparator for use with character recognition apparatus which identifies a presented character as being one of a plurality of types, comprising:

means for generating voltages proportional to the features of said presented character;

a plurality of groups of resistance means, each group of resistance means being associated with one of said types and each group of resistance means being selectively connected to said means for generating voltages, each group of resistance means being responsive to said means for generating voltages for producing a plurality of independent potential levels;

means for comparing each of the plurality of independent potential levels of each group with predetermined threshold levels; and means for identifying said presented character as being one of said plurality of types when each of the independent potential levels in the group associated with said one type is within said predetermined threshold levels.

20. Character recognition apparatus for identifying an unknown character whose features may vary is being one of a predetermined plurality of types, said features being represented by *n* voltages, comprising:

voltage generating means responsive to said n voltages for generating two oppositely phased voltages from each said *n* voltages;

at most *n* resistor networks associated with each of said predetermined plurality of types, each resistor network comprised of at most *n* combination resistors and a summation resistor, said at most *n* combination resistors and said summation resistor in a network exhibiting a common connection between first terminals thereof, the second terminal of each combination resistor in a network being supplied with a voltage of selected phase generated by said voltage generating means;

an AND-gate-threshold means associated with each of said predetermined plurality of types, each AND gate threshold means having $n$ input terminals coupled to the $n$ common connections of the at most $n$ resistor networks associated with a corresponding one of said predetermined plurality of types for determining if each of the voltages developed at said $n$ common connections are within predetermined threshold levels; and decision logic means coupled to the output terminal of each AND-gate-threshold means for indicating the identity of said unknown character if all of said developed voltages of said at most $n$ resistor networks associated with one of said predetermined plurality of types are within their predetermined threshold levels.

21. The apparatus of claim 20 wherein said common connection in each resistor network is coupled to a further voltage generator by an additional resistor, the magnitude of the voltage generated by said further voltage generator and the magnitude of said additional resistor establishing said predetermined threshold levels at an approximately zero potential level.

22. The apparatus of claim 21 wherein said further voltage generator generates a substantially constant voltage.

23. The apparatus of claim 21 wherein said further voltage generator generates a voltage proportional to the sum of all said oppositely phased voltages.

24. The apparatus of claim 20 wherein all of said oppositely phased voltages generated in response to said $n$ voltages alternate in polarity at a frequency of at least 1,000 Hz.

* * * * *